(12) United States Patent
Hino (10) Patent No.: US 6,325,739 B1
(45) Date of Patent: Dec. 4, 2001

(54) BICYCLE HUB TRANSMISSION WITH A MECHANISM FOR STOPPING ROTATION OF ONE OR MORE SUN GEARS RELATIVE TO ANOTHER MEMBER

(75) Inventor: Tetsuya Hino, Shimonoseki (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 09/474,883

(22) Filed: Dec. 29, 1999

(51) Int. Cl.[7] ........................................... F16H 3/44
(52) U.S. Cl. .............................. 475/298; 475/288
(58) Field of Search .................... 475/288, 296, 475/298, 300, 314, 339, 340

(56) References Cited

U.S. PATENT DOCUMENTS

| | | | |
|---|---|---|---|
| 4,721,013 | * | 1/1988 | Steuer et al. ............. 475/300 X |
| 5,399,128 | * | 3/1995 | Nurnberger ................. 475/298 |
| 5,785,625 | * | 7/1998 | Matsuo et al. ........... 475/298 X |
| 5,829,563 | * | 11/1998 | Shoge ....................... 475/298 X |
| 5,855,530 | * | 1/1999 | Huang et al. ............ 475/288 X |
| 5,928,103 | | 7/1999 | Shoge ............................ 475/297 |
| 5,938,560 | * | 8/1999 | Steuer ..................... 475/298 X |
| 5,964,678 | * | 10/1999 | Hanada et al. .......... 475/298 X |
| 5,964,679 | * | 10/1999 | Matsuo et al. ........... 475/296 X |
| 6,039,671 | * | 3/2000 | Keller ............................ 475/296 |
| 6,134,980 | * | 10/2000 | Uchiyama ................ 475/298 X |

FOREIGN PATENT DOCUMENTS

| | | | |
|---|---|---|---|
| 383350 | * | 8/1990 | (EP) .............................. 475/288 |
| 2166502 | * | 12/1988 | (GB) .............................. 475/298 |
| 2275512 | * | 8/1994 | (GB) .............................. 475/298 |
| 7-10069 | | 1/1995 | (JP) . |

* cited by examiner

Primary Examiner—Charles A Marmor
Assistant Examiner—Roger Pang
(74) Attorney, Agent, or Firm—James A. Deland (57) ABSTRACT

An internal hub transmission for a bicycle includes a hub axle for retaining the transmission to a bicycle frame, wherein the hub axle has an axle axis; a driver rotatably supported relative to the hub axle; an output member rotatably supported relative to the hub axle; and a planet gear mechanism. The planet gear mechanism includes a sun gear rotatably supported relative to the hub axle and movable in a direction of the axle axis; a planet gear carrier rotatably supported relative to the hub axle; a planet gear rotatably supported to the planet gear carrier, wherein the planet gear meshes with the sun gear; and a ring gear meshing with the planet gear. The sun gear moves in the direction of the axle axis between a first position, wherein the sun gear is nonrotatably coupled to a coupled member, and a second position, wherein the sun gear is decoupled from the coupled member. The coupled member is one of the hub axle, the driver, the planet gear carrier, and the output member. A stop member is disposed on one of the sun gear and the coupled member, and a complementary stop member disposed on the other one of the sun gear and the coupled member. At least one of the stop member and the complementary stop member includes a surface that pushes the sun gear away from the coupled member toward the second position.

36 Claims, 5 Drawing Sheets

BICYCLE HUB TRANSMISSION WITH A MECHANISM FOR STOPPING ROTATION OF ONE OR MORE SUN GEARS RELATIVE TO ANOTHER MEMBER

BACKGROUND OF THE INVENTION

The present invention is directed to bicycle transmissions and, more particularly, to internal hub transmissions that use planetary gear mechanisms.

A typical internal hub transmission for a bicycle includes a hub axle for retaining the transmission to a bicycle frame, a driver rotatably supported relative to the hub axle, and an output member rotatably supported relative to the hub axle. The driver usually is mounted with a sprocket for receiving a driving force from a chain connected to the pedal cranks, and the output member usually is a hub shell that is connected to the wheel spokes which, in turn, are connected to the wheel rim. A planet gear mechanism usually is disposed between the driver and the hub shell for communicating the rotational force from the driver to the hub shell through a plurality of transmission paths which change the drive ratio of the transmission. In a three speed hub, for example, the planet gear mechanism may include a first sun gear and a second sun gear rotatably supported relative to the hub axle, an intermediate gear unit rotatably supported relative to the hub axle, wherein the intermediate gear unit meshes with the first and second sun gears, and a ring gear meshing with the intermediate gear unit.

Changing the gear ratio in a planet gear mechanism usually involves selectively stopping the rotation of the first and second sun gears relative to the hub axle. This usually involves coupling the first sun gear to the hub axle using a coupling member interposed between the first sun gear and the hub axle, and then coupling the second sun gear to the hub axle using another coupling member interposed between the second sun gear and the hub axle. Sometimes a single coupling member is used to perform both functions. Such a coupling member usually takes the form of an elongated member that slides along the hub axle, wherein the coupling member initially engages a first stopper on the first sun gear and a first stopper on the hub axle and then slides along the hub axle to that the coupling member engages a second stopper on the second sun gear and a second stopper on the hub axle. If the width of the elongated member is less than the distance between the first stopper on the first sun gear and the second stopper on the second sun gear, there may be a time while the elongated member is being moved from the first sun gear to the second sun gear that the coupling member is disengaged from both the first sun gear and the second sun gear, thus causing a break in the power transmission path between the driver and the hub shell and causing freewheeling of the hub shell.

SUMMARY OF THE INVENTION

The present invention is directed to an internal hub transmission for a bicycle wherein a coupling member which selectively engages a sun gear does so without causing freewheeling of the hub when shifting from one gear to another. In one embodiment of the present invention, an internal hub transmission for a bicycle includes a hub axle for retaining the transmission to a bicycle frame, wherein the hub axle has an axle axis; a driver rotatably supported relative to the hub axle; an output member rotatably supported relative to the hub axle; and a planet gear mechanism. The planet gear mechanism includes a sun gear rotatably supported relative to the hub axle and movable in a direction of the axle axis; a planet gear carrier rotatably supported relative to the hub axle; a planet gear rotatably supported to the planet gear carrier, wherein the planet gear meshes with the sun gear; and a ring gear meshing with the planet gear. The sun gear moves in the direction of the axle axis between a first position, wherein the sun gear is nonrotatably coupled to a coupled member, and a second position, wherein the sun gear is decoupled from the coupled member. The coupled member is one of the hub axle, the driver, the planet gear carrier, and the output member. A stop member is disposed on one of the sun gear and the coupled member, and a complementary stop member disposed on the other one of the sun gear and the coupled member. At least one of the stop member and the complementary stop member includes a surface that pushes the sun gear away from the coupled member toward the second position.

In a more specific embodiment of the present invention, an internal hub transmission for a bicycle includes a hub axle for retaining the transmission to a bicycle frame, wherein the hub axle has an axle axis; a driver rotatably supported relative to the hub axle; an output member rotatably supported relative to the hub axle; and a planet gear mechanism disposed between the driver and the output member. The planet gear mechanism includes a first sun gear rotatably supported relative to the hub axle; a second sun gear rotatably supported relative to the hub axle; an intermediate gear unit rotatably supported relative to the hub axle, wherein the intermediate gear unit meshes with the first sun gear and the second sun gear; and a ring gear meshing with the intermediate gear unit.

In this embodiment, a sun gear stop mechanism is provided for selectively nonrotatably coupling at least one of the first sun gear and the second sun gear relative to the hub axle. The sun gear stop mechanism includes a first stop member spaced apart by a first width from a second stop member, wherein the first stop member and the second stop member are coupled to one of: 1) the first sun gear and the second sun gear; or 2) the hub axle. The sun gear stop mechanism also includes a complementary stop unit, wherein the complementary stop unit is coupled to the other one of: 1) the first sun gear and the second sun gear; or 2) the hub axle. The complementary stop unit moves between the first stop member and the second stop member for selectively engaging at least one of the first stop member and the second stop member, wherein a portion of the complementary stop unit that engages the at least one of the first stop member and the second stop member has a second width greater than the first width.

In an even more specific embodiment, the first stop member and the second stop member are coupled to the hub axle, and the complementary stop unit comprises a first complementary stop member disposed between the first sun gear and the hub axle and a second complementary stop member disposed between the second sun gear and the hub axle, wherein the complementary stop unit moves in the direction of the axle axis. To ensure a reliable switching operation, at least one of the first stop member, the second stop member and the complementary stop unit includes a surface that pushes the complementary stop unit away from the selectively engaged first stop member or second stop member.

DETAILED DESCRIPTION OF THE EMBODIMENTS

Figure 1:
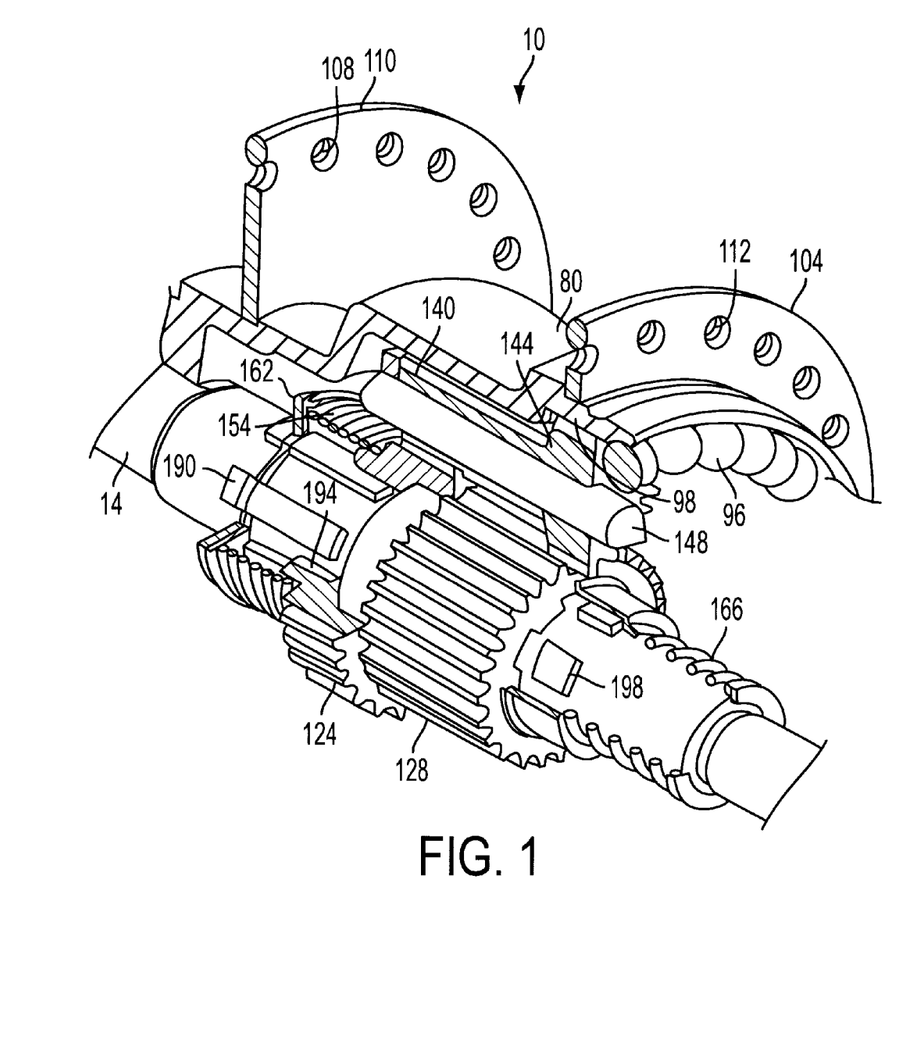
FIG. 1 is a cutaway view showing a particular embodiment of a bicycle hub transmission according to the present invention.
Figure 2:
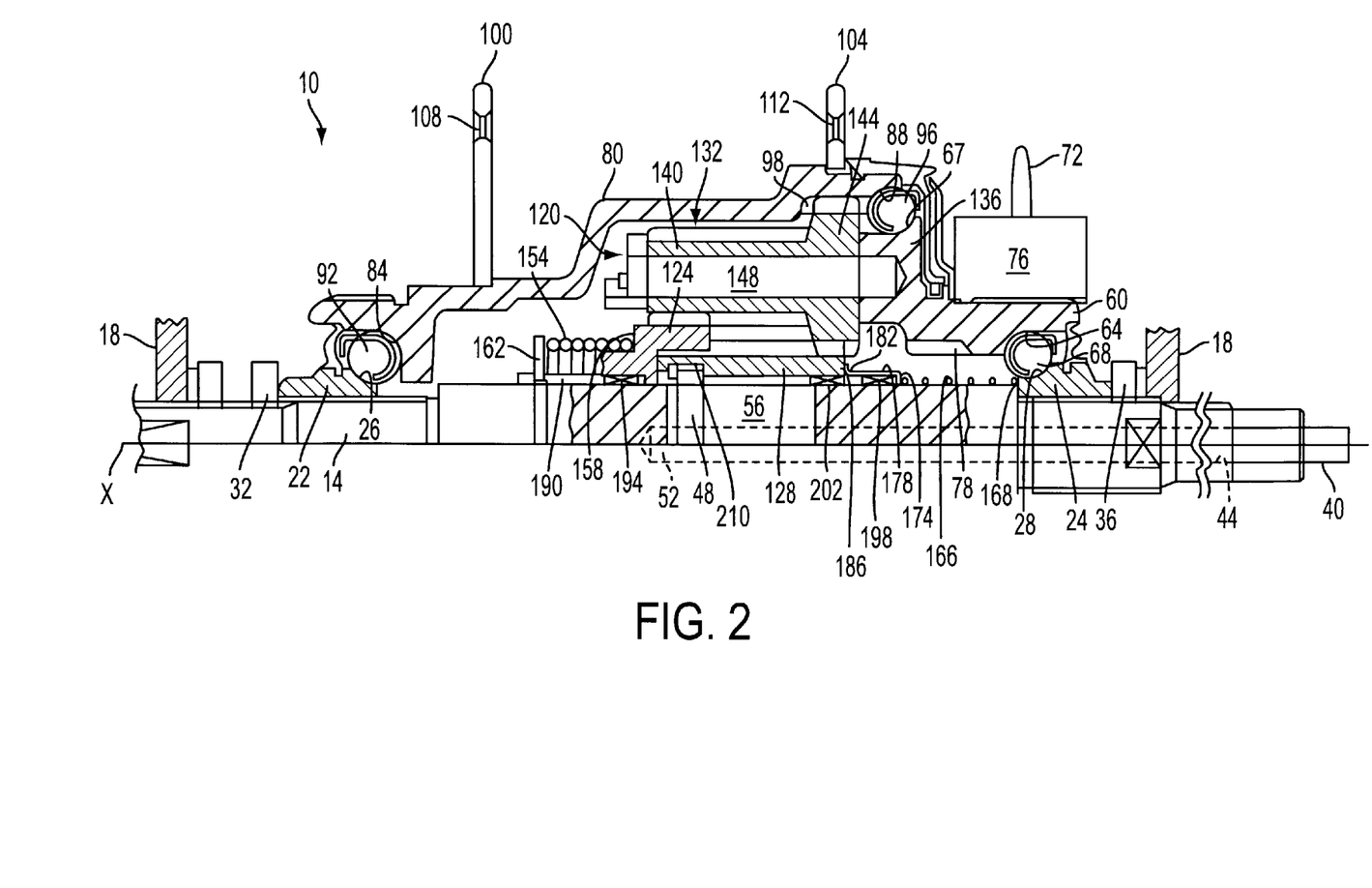
FIG. 2 is a cross sectional view of the bicycle hub transmission in a high speed position.

FIG. 1 is a cutaway view showing a particular embodiment of a bicycle hub transmission 10 according to the present invention, and FIG. 2 is a cross sectional view of transmission 10 in a high speed position. Transmission 10 includes a hub axle 14 that extends along an axle axis X for retaining transmission 10 to a bicycle frame 18. Bearing races 22 and 24 with bearing supporting surfaces 26 and 28, respectively, are screwed onto axle 14 and fixed in place with lock nuts 32 and 36. A transmission actuating rod 40 is slidingly disposed in a central bore 44 formed in axle 14, and a shift key 48 retained to the inner end 52 of transmission actuating rod 40 extends radially outwardly through a slot 56 formed in axle 14 for switching gear ratios in a manner described below.

A driver 60 with an inner peripheral bearing supporting surface 64 and an outer peripheral bearing supporting surface 67 is rotatably supported relative to hub axle 14 by ball bearings 68 disposed between bearing supporting surfaces 28 and 64. Driver 60 supports a chain drive sprocket 72 through a conventional one-way clutch (freewheel) device 76 that ordinarily uses a ratchet and pawl mechanism so that drive sprocket 72 drivingly engages driver 60 in only one rotational direction. A plurality of planet gear stop teeth 78 are formed on the inner peripheral surface of driver 60 for reasons discussed below.

An output member in the form of a hub shell 80 has inner peripheral bearing supporting surfaces 84 and 88 so that hub shell 80 can be rotatably supported relative to axle 14 by ball bearings 92 disposed between bearing supporting surfaces 26 and 84 and ball bearings 96 disposed between bearing supporting surfaces 67 and 88. The inner peripheral surface of hub shell 80 also includes a plurality of circumferentially disposed teeth forming a ring gear 98. Hub shell 80 includes hub flanges 100 and 104 with spoke attachment holes 108 and 112, respectively, for attaching wheel spokes (not shown) in a well known manner.

A planet gear mechanism 120 is disposed in a power transmission path between driver 60 and hub shell 80 for communicating rotational power from driver 60 to hub shell 80 through a plurality of power transmission paths, thus changing the drive (gear) ratio. Planet gear mechanism 120 includes a first sun gear 124 rotatably supported relative to axle 14, a separate second sun gear 128 rotatably supported relative to axle 14 and first sun gear 124, and an intermediate gear unit 132 rotatably supported relative to axle 14, wherein intermediate gear unit 132 meshes with first sun gear 124, second sun gear 128 and ring gear 98. Intermediate gear unit 132 includes a planet gear carrier 136 which, in this embodiment, is formed as one piece with driver 60. A small diameter planet gear 140 is formed as one piece with a large diameter planet gear 144, and both planet gears 140 and 144 are rotatably supported to planet gear carrier 136 by a planet gear axle 148. Small diameter planet gear 140 meshes with first sun gear 124, and large diameter planet gear 144 meshes with second sun gear 128 and ring gear 98. Although not shown in the Figures, three such planet gear/axle units are circumferentially supported by planet gear carrier 136 in a well known manner.

First sun gear 124 is biased toward second sun gear 128 by a coil spring 154 disposed between an abutment 158 formed on first sun gear 124 and an abutment 162 disposed on axle 14 so that first sun gear 124 contacts second sun gear 128. Similarly, second sun gear 128 is independently biased toward first sun gear 124 by a coil spring 166 disposed between an abutment 168 disposed on bearing race 24 and a first end 174 of a cylindrical thrust bearing 178. The other end 182 of thrust bearing 178 abuts against a side surface 186 of second sun gear 128. Spring 154 has a larger spring force than spring 166.

A plurality of first sun gear stop members 190 having the shape of splines are circumferentially formed on the outer peripheral surface of axle 14 for selectively engaging a plurality of complementary stop members 194 also having the shape of splines immovably and circumferentially formed as one piece on the inner peripheral surface of first sun gear 124. Similarly, a plurality of second sun gear stop members 198 having the shape of splines are circumferentially formed on the outer peripheral surface of axle 14 for selectively engaging a plurality of complementary stop members 202 also having the shape of splines immovably and circumferentially formed as one piece on the inner peripheral surface of second sun gear 128.

The inner peripheral surface of second sun gear 128 also includes a groove 210 for engaging shift key 48. Thus, moving transmission actuating member 40 to the right causes second sun gear 128 to move to the right, and first sun gear 124 follows second sun gear 128 to the right as a result of the biasing force of spring 154. Moving transmission actuating member 40 to the left causes second sun gear 128 to move to the left, and second sun gear 128 simultaneously pushes first sun gear 124 to the left.

Figure 3:
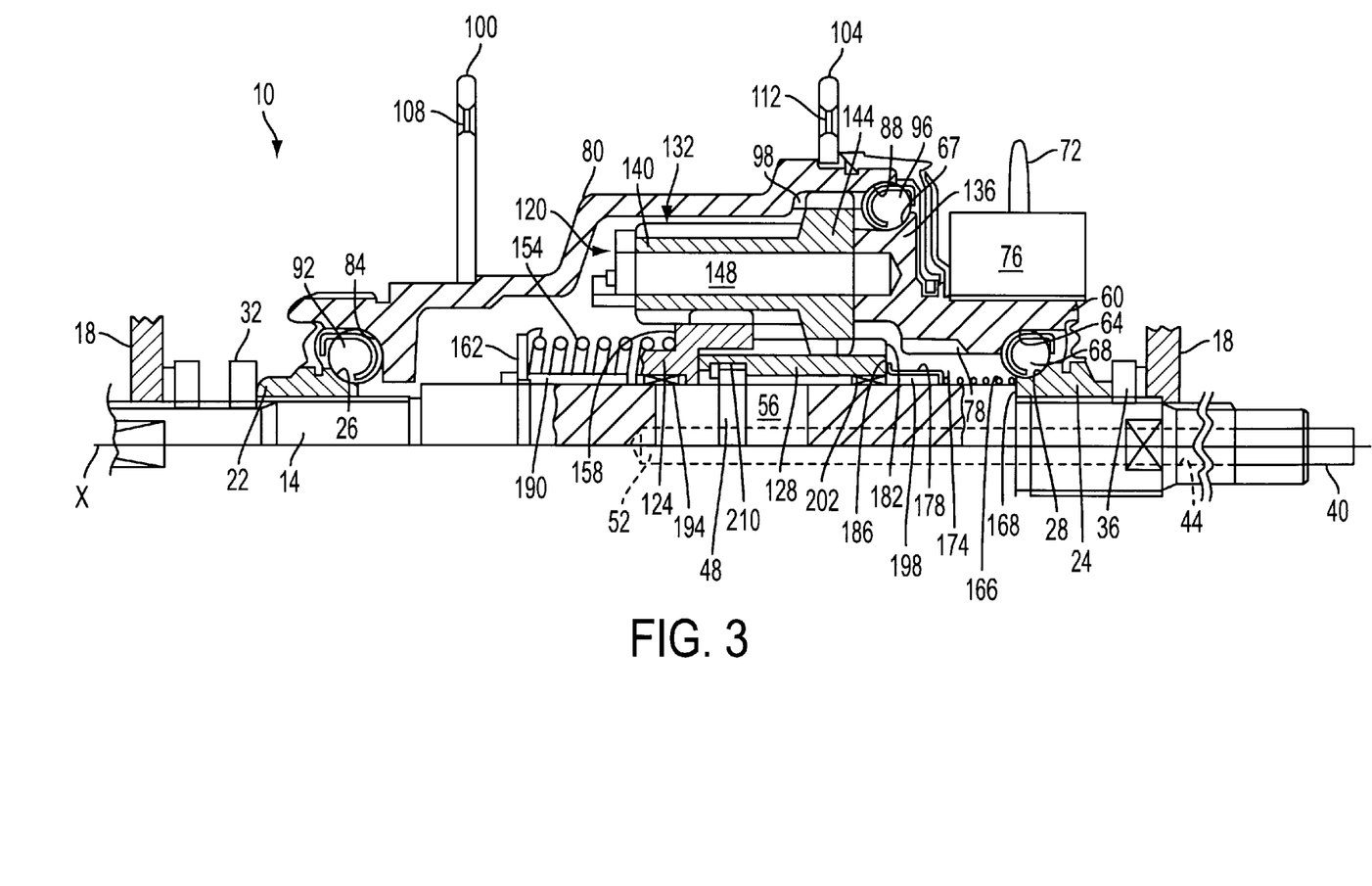
FIG. 3 is a cross sectional view of the bicycle hub transmission in a middle speed position.
Figure 5:
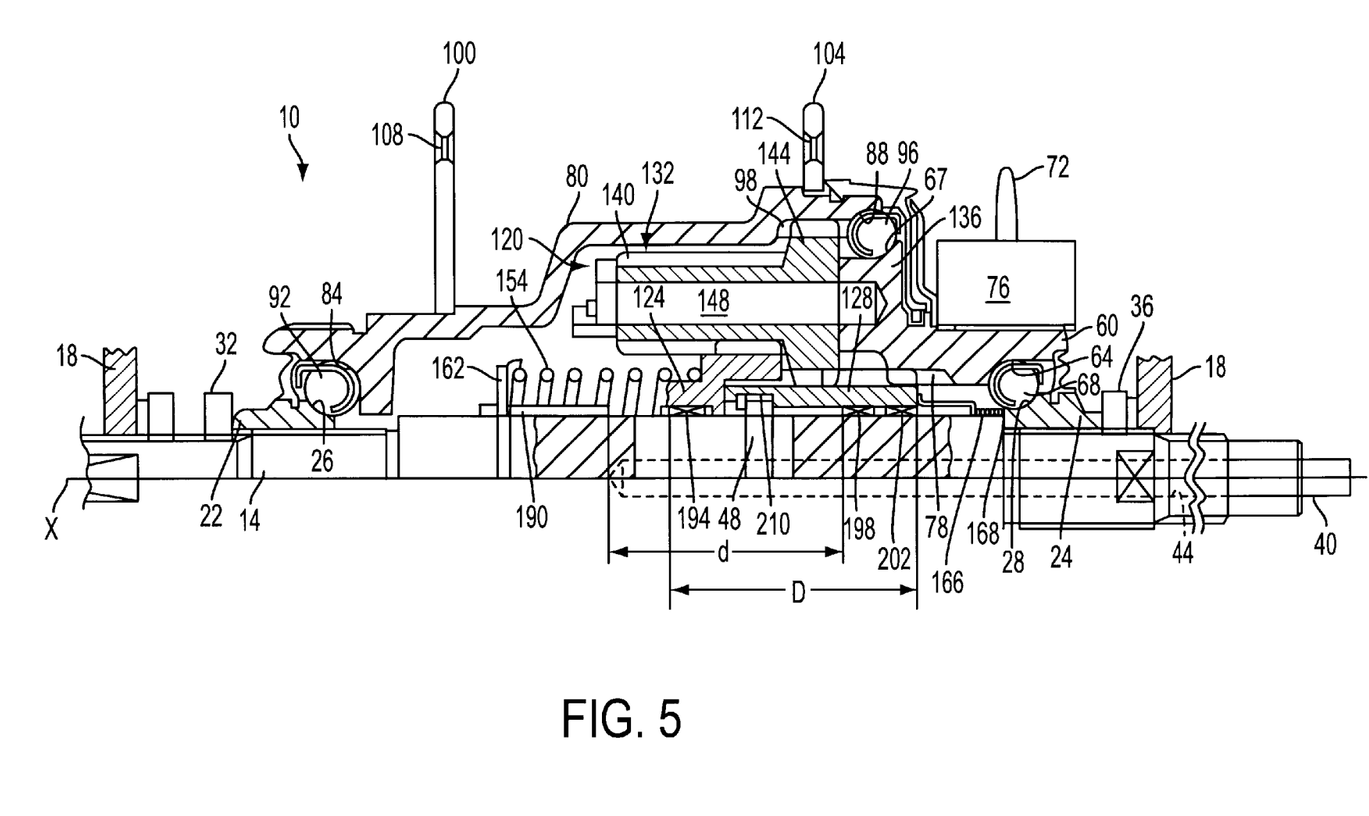
FIG. 5 is a cross sectional view of the bicycle hub transmission in a low speed position.

FIGS. 2–5 illustrate the operation of transmission 10, wherein FIG. 2 shows transmission 10 in a high speed position, FIG. 3 shows transmission 10 in a middle speed position, and FIG. 5 shows transmission 10 in a low speed position. When transmission 10 is in the high speed position shown in FIG. 2, first sun gear stop members 190 engage the complementary stop members 194 on first sun gear 124, thus nonrotatably coupling first sun gear 124 to axle 14. Second sun gear stop members 198 are disengaged from the complementary stop members 202 on second sun gear 128, so second sun gear 128 rotates freely. As a result, power is transmitted from driver 60 through large diameter planet gear 144 and ring gear 98 to hub shell 80 at a ratio determined by the number of teeth on first sun gear 124 and small diameter planet gear 140.

Transmission 10 is set into the middle speed position shown in FIG. 3 by moving transmission actuating rod 40 to the right, thus disengaging first sun gear stop members 190 from the complementary stop members 194 on first sun gear 124 so that first sun gear 124 rotates freely, and engaging second sun gear stop members 198 with the complementary stop members 202 on second sun gear 128 so that second sun gear 128 is nonrotatably coupled to axle 14. As a result, power is transmitted from driver 60 through large diameter planet gear 144 and ring gear 98 to hub shell 80 at a ratio determined by the number of teeth on second sun gear 128 and large diameter planet gear 144.

Figure 4A:
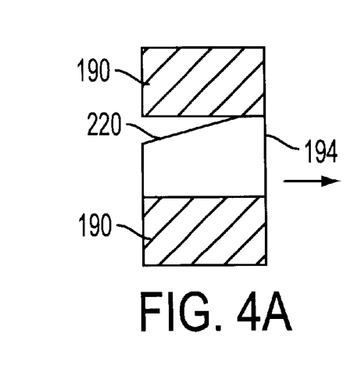
FIGS. 4A–4C are detailed views illustrating the disengagement of a first sun gear from a first sun gear stop member on the hub axle.
Figure 4B:
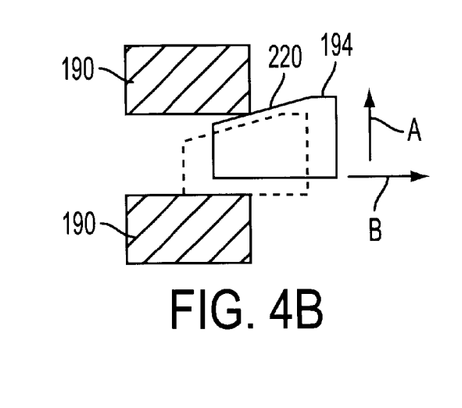
Figure 4C:
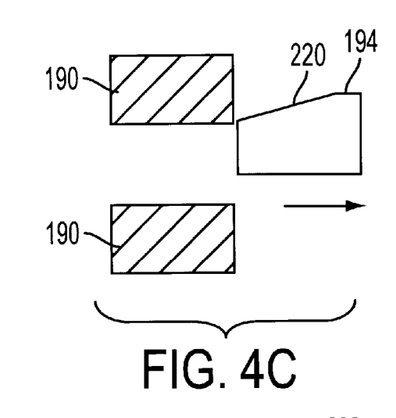

As shown in FIG. 5, a distance D between the outer edges of complementary stop members 194 and 202 is greater than a distance d between the inner edges of first sun gear stop members 190 and second sun gear stop members 198. Thus, there is never a time when shifting from the high speed position shown in FIG. 2 to the middle speed position shown in FIG. 3 that both first sun gear 124 and second sun gear 128 can rotate freely relative to axle 14. Thus, hub shell 80 will not freewheel when shifting from the high speed position to the middle speed position. To ensure that both first sun gear 124 and second sun gear 128 do not become permanently coupled to axle 14, complementary stop members 194 on first sun gear 124 have tapered surfaces 220 as shown in FIGS. 4A–4C that are inclined in the direction of axis X. Thus, as complementary stop members 194 move from the high speed position to the right as shown in FIGS. 4A and 4B, tapered surfaces 220 function as drive surfaces to convert rotational motion of complementary stop members 194 in the direction of arrow A into axial motion in the direction of arrow B to ensure that complementary stop members 194 disengage from first sun gear stop members 190 as shown in FIG. 4C.

Transmission 10 is set into the low speed position shown in FIG. 5 by moving transmission actuating rod 40 further to the right, thus disengaging second sun gear stop members 198 from the complementary stop members 202 on second sun gear 128 so that second sun gear 128 rotates freely. First sun gear stop members 190 remain disengaged from the complementary stop members 194 on first sun gear 124 so that first sun gear 124 continues to rotate freely. However, in this state second sun gear 128 engages both large diameter planet gear 144 and planet gear stop teeth 78 on driver 60, thus nonrotatably coupling large diameter planet gear 144 to driver 60. As a result, power is transmitted directly from driver 60 through large diameter planet gear 144 and ring gear 98 to hub shell 80 at a 1:1 drive ratio.

Figure 6A:
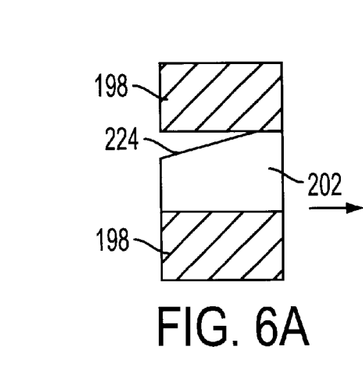
FIGS. 6A–6C are detailed views illustrating the disengagement of a second sun gear from a second sun gear stop member on the hub axle.
Figure 6B:
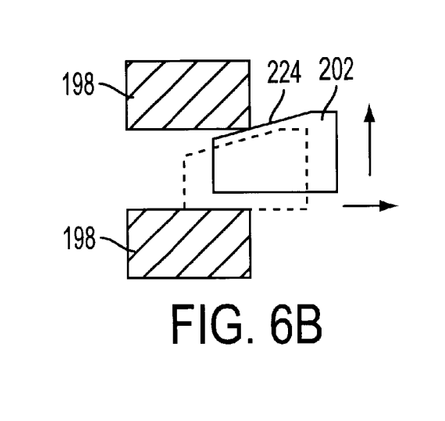
Figure 6C:
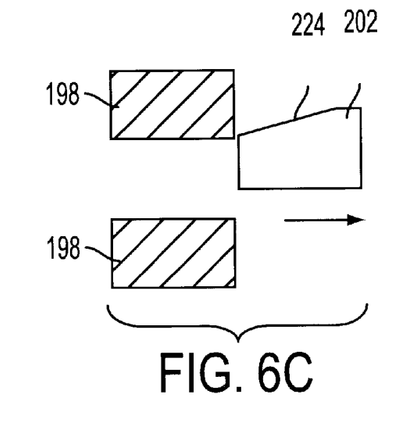

To ensure that second sun gear 128 completes the transition from the position shown in FIG. 3 to the position shown in FIG. 5, complementary stop members 202 on second sun gear 128 have tapered surfaces 224 as shown in FIGS. 6A–6C that are inclined in the direction of axis X. Thus, as complementary stop members 202 move from the middle speed position to the right as shown in FIGS. 6A and 6B, tapered surfaces 224 function as drive surfaces to convert rotational motion of complementary stop member 202 in the direction of arrow A into axial motion in the direction of arrow B to ensure that complementary stop members 202 disengage from second sun gear stop members 198 as shown in FIG. 4C.

While the above is a description of various embodiments of the present invention, further modifications may be employed without departing from the spirit and scope of the present invention. For example, first sun gear 124 and second sun gear 128 could remain stationary in the direction of the axis X with first sun gear stop members 190 and second sun gear stop members 198 moved in the direction of axis X. In any embodiment, tapered surfaces that function like the tapered surfaces 220 and 224 could be formed on first sun gear stop members 190 and/or second sun gear stop members 198 alone or in addition to tapered surfaces 220 and 224, or even on the teeth on the outer peripheral surface of the sun gear. The invention could be applied to movement of the sun gears toward the left in the drawings as well. The invention could be applied to a hub that has a sun gear nonrotatably coupled to the hub shell 80 and/or the sun gear nonrotatably coupled to a separate planet gear carrier. The size, shape, location or orientation of the various components may be changed as desired. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. An internal hub transmission for a bicycle comprising:
   a hub axle for retaining the transmission to a bicycle frame, wherein the hub axle has an axle axis;
   a driver rotatably supported relative to the hub axle;
   an output member rotatably supported relative to the hub axle;
   a planet gear mechanism including:
      a first sun gear rotatably supported relative to the hub axle;
      a second sun gear rotatably supported relative to the hub axle;
      an intermediate gear unit rotatably supported relative to the hub axle, wherein the intermediate gear unit meshes with the first sun gear and the second sun gear; and
      a ring gear meshing with the intermediate gear unit;
   a sun gear stop mechanism for selectively nonrotatably coupling at least one of the first sun gear and the second sun gear relative to the hub axle;
   wherein the sun gear stop mechanism includes:
      a first stop member spaced apart by a first width from a second stop member;
      wherein the first stop member and the second stop member are coupled to one of: 1) the first sun gear and the second sun gear; or 2) the hub axle;
      a complementary stop unit;
      wherein the complementary stop unit is coupled to the other one of: 1) the first sun gear and the second sun gear; or 2) the hub axle;
      wherein the complementary stop unit moves between the first stop member and the second stop member for selectively engaging at least one of the first stop member and the second stop member; and
      wherein a portion of the complementary stop unit that engages the at least one of the first stop member and the second stop member has a second width greater than the first width.

2. The internal hub transmission according to claim 1 wherein at least one of the first stop member, the second stop member and the complementary stop unit includes a surface that pushes the complementary stop unit away from the selectively engaged first stop member and second stop member.

3. The internal hub transmission according to claim 1 wherein the first stop member and the second stop member are coupled to the hub axle.

4. The internal hub transmission according to claim 3 wherein the complementary stop unit comprises a first complementary stop member coupled to the first sun gear and a second complementary stop member coupled to the second sun gear.

5. The internal hub transmission according to claim 4 wherein the complementary stop unit moves in the direction of the axle axis.

6. The internal hub transmission according to claim 5 wherein the first complementary stop member is disposed between the first sun gear and the hub axle, and wherein the second complementary stop member is disposed between the second sun gear and the hub axle.

7. The internal hub transmission according to claim 6 further comprising an actuating member disposed in the hub axle for moving the first sun gear and the second sun gear in the direction of the axle axis.

8. The internal hub transmission according to claim 6 wherein the first complementary stop member is disposed between an inner peripheral surface of the first sun gear and the hub axle, and wherein the second complementary stop member is disposed between an inner peripheral surface of the second sun gear and the hub axle.

9. The internal hub transmission according to claim 8 wherein the first complementary stop member is immovably mounted to the first sun gear, and wherein the second complementary stop member is immovably mounted to the second sun gear.

10. The internal hub transmission according to claim 9 wherein the first complementary stop member is one-piece with the first sun gear, and wherein the second complementary stop member is one-piece with the second sun gear.

11. The internal hub transmission according to claim 6 wherein the first sun gear is separate from the second sun gear.

12. The internal hub transmission according to claim 11 therein the first sun gear rotates relative to the second sun gear.

13. The internal hub transmission according to claim 12 further comprising a biasing mechanism for biasing the first sun gear toward the second sun gear.

14. The internal hub transmission according to claim 13 wherein the first sun gear contacts the second sun gear.

15. An internal hub transmission for a bicycle comprising:
   a hub axle for retaining the transmission to a bicycle frame, wherein the hub axle has an axle axis;
   a driver rotatably supported relative to the hub axle;
   an output member rotatably supported relative to the hub axle;
   a planet gear mechanism including:
      a first sun gear rotatably supported relative to the hub axle;
      a second sun gear rotatably supported relative to the hub axle;
      an intermediate gear unit rotatably supported relative to the hub axle, wherein the intermediate gear unit meshes with the first sun gear and the second sun gear; and
      a ring gear meshing with the intermediate gear unit;
   a sun gear stop mechanism for selectively nonrotatably coupling at least one of the first sun gear and the second sun gear relative to the hub axle;
   wherein the sun gear stop mechanism includes:
      a first stop member spaced apart by a first width from a second stop member;
      wherein the first stop member and the second stop member are coupled to the hub axle;
      a complementary stop unit;
      wherein the complementary stop unit is coupled to the first sun gear and the second sun gear;
      wherein the complementary stop unit moves between the first stop member and the second stop member for selectively engaging at least one of the first stop member and the second stop member;
      wherein a portion of the complementary stop unit that engages the at least one of the first stop member and the second stop member has a second width greater than the first width;
   wherein the complementary stop unit comprises a first complementary stop member coupled to the first sun gear and a second complementary stop member coupled to the second sun gear;
   wherein the complementary stop unit moves in the direction of the axle axis;
   wherein the first complementary stop member is disposed between the first sun gear and the hub axle, and wherein the second complementary stop member is disposed between the second sun gear and the hub axle; and
   wherein at least one of the first stop member, the second stop member and the complementary stop unit includes a surface that pushes the complementary stop unit away from the selectively engaged first stop member and second stop member.

16. An internal hub transmission for a bicycle comprising:
   a hub axle for retaining the transmission to a bicycle frame, wherein the hub axle has an axle axis;
   a driver rotatably supported relative to the hub axle;
   an output member rotatably supported relative to the hub axle;
   a planet gear mechanism including:
      a first sun gear rotatably supported relative to the hub axle;
      a second sun gear rotatably supported relative to the hub axle;
      an intermediate gear unit rotatably supported relative to the hub axle, wherein the intermediate gear unit meshes with the first sun gear and the second sun gear; and
      a ring gear meshing with the intermediate gear unit;
   a sun gear stop mechanism for selectively nonrotatably coupling at least one of the first sun gear and the second sun gear relative to the hub axle;
   wherein the sun gear stop mechanism includes:
      a first stop member spaced apart by a first width from a second stop member;
      wherein the first stop member and the second stop member are coupled to the hub axle;
      a complementary stop unit;
      wherein the complementary stop unit is coupled to the first sun gear and the second sun gear;
      wherein the complementary stop unit moves between the first stop member and the second stop member for selectively engaging at least one of the first stop member and the second stop member;
      wherein a portion of the complementary stop unit that engages the at least one of the first stop member and the second stop member has a second width greater than the first width;
   wherein the complementary stop unit comprises a first complementary stop member coupled to the first sun gear and a second complementary stop member coupled to the second sun gear;
   wherein the complementary stop unit moves in the direction of the axle axis;
   wherein the first complementary stop member is disposed between an inner peripheral surface of the first sun gear and the hub axle, and wherein the second complementary stop member is disposed between an inner peripheral surface of the second sun gear and the hub axle;

wherein the first complementary stop member is one-piece with the first sun gear, and wherein the second complementary stop member is one-piece with the second sun gear; and wherein at least one of the first stop member and the first complementary stop member includes a surface that pushes the first complementary stop member away from the first stop member in response to a rotational force of the first sun gear.

17. The internal hub transmission according to claim 16 further comprising an actuating member disposed in the hub axle for moving the first sun gear and the second sun gear in the direction of the axle axis.

18. An internal hub transmission for a bicycle comprising:
a hub axle for retaining the transmission to a bicycle frame, wherein the hub axle has an axle axis;
a driver rotatably supported relative to the hub axle;
an output member rotatably supported relative to the hub axle;
a planet gear mechanism including:
a first sun gear rotatably supported relative to the hub axle;
a second sun gear rotatably supported relative to the hub axle;
an intermediate gear unit rotatably supported relative to the hub axle, wherein the intermediate gear unit meshes with the first sun gear and the second sun gear; and
a ring gear meshing with the intermediate gear unit;
a sun gear stop mechanism for selectively nonrotatably coupling at least one of the first sun gear and the second sun gear relative to the hub axle;
wherein the sun gear stop mechanism includes:
a first stop member spaced apart by a first width from a second stop member;
wherein the first stop member and the second stop member are coupled to the hub axle;
a complementary stop unit;
wherein the complementary stop unit is coupled to the first sun gear and the second sun gear;
wherein the complementary stop unit moves between the first stop member and the second stop member for selectively engaging at least one of the first stop member and the second stop member;
wherein a portion of the complementary stop unit that engages the at least one of the first stop member and the second stop member has a second width greater than the first width;
wherein the complementary stop unit comprises a first complementary stop member coupled to the first sun gear and a second complementary stop member coupled to the second sun gear;
wherein the complementary stop unit moves in the direction of the axle axis;
wherein the first complementary stop member is disposed between the first sun gear and the hub axle, and wherein the second complementary stop member is disposed between the second sun gear and the hub axle; and
wherein the first sun gear is separate from the second sun gear;
wherein the first sun gear rotates relative to the second sun gear;
a biasing mechanism for biasing the first sun gear toward the second sun gear;
wherein the first sun gear contacts the second sun gear; and wherein at least one of the first stop member and the first complementary stop member includes a surface that pushes the first complementary stop member away from the first stop member in response to a rotational force of the first sun gear.

19. The internal hub transmission according to claim 18 further comprising an actuating member disposed in the hub axle for moving the first sun gear and the second sun gear in the direction of the axle axis.

20. An internal hub transmission for a bicycle comprising:
a hub axle for retaining the transmission to a bicycle frame, wherein the hub axle has an axle axis;
a driver rotatably supported relative to the hub axle;
an output member rotatably supported relative to the hub axle;
a planet gear mechanism including:
a sun gear rotatably supported relative to the hub axle;
an intermediate gear unit rotatably supported relative to the hub axle, wherein the intermediate gear unit meshes with the sun gear; and
a ring gear meshing with the intermediate gear unit;
a sun gear stop mechanism for selectively nonrotatably coupling the sun gear relative to the hub axle;
wherein the sun gear stop mechanism includes:
a first stop member spaced apart by a first width from a second stop member;
wherein the first stop member and the second stop member are coupled to one of the sun gear or the hub axle;
a complementary stop unit;
wherein the complementary stop unit is coupled to the other one of the sun gear or the hub axle;
wherein the complementary stop unit moves between the first stop member and the second stop member for selectively engaging at least one of the first stop member and the second stop member; and
wherein at least one of the first stop member, the second stop member and the complementary stop unit includes a surface that pushes the complementary stop unit away from the selectively engaged first stop member and second stop member in response to a rotational force of the sun gear.

21. An internal hub transmission for a bicycle comprising:
a hub axle for retaining the transmission to a bicycle frame, wherein the hub axle has an axle axis;
a driver rotatably supported relative to the hub axle;
an output member rotatably supported relative to the hub axle;
a planet gear mechanism including:
a first sun gear rotatably supported relative to the hub axle;
a second sun gear rotatably supported relative to the hub axle;
an intermediate gear unit rotatably supported relative to the hub axle, wherein the intermediate gear unit meshes with the first sun gear and the second sun gear; and
a ring gear meshing with the intermediate gear unit;
a sun gear stop mechanism for selectively nonrotatably coupling at least one of the first sun gear and the second sun gear relative to the hub axle;
wherein the sun gear stop mechanism includes:
a first stop member spaced apart by a first width from a second stop member;
wherein the first stop member and the second stop member are coupled to one of: 1) the first sun gear and the second sun gear; or 2) the hub axle;

a complementary stop unit;
wherein the complementary stop unit is coupled to the other one of: 1) the first sun gear and the second sun gear; or 2) the hub axle;
wherein the complementary stop unit moves between the first stop member and the second stop member for selectively engaging at least one of the first stop member and the second stop member; and
wherein at least one of the first stop member, the second stop member and the complementary stop unit includes a surface that pushes the complementary stop unit away from the selectively engaged first stop member and second stop member in response to a rotational force of at least one of the first sun gear and the second sun gear.

22. The internal hub transmission according to claim 21 wherein the first stop member and the second stop member are coupled to the hub axle.

23. An internal hub transmission for a bicycle comprising:
a hub axle for retaining the transmission to a bicycle frame, wherein the hub axle has an axle axis;
a driver rotatably supported relative to the hub axle;
an output member rotatably supported relative to the hub axle;
a planet gear mechanism including:
a first sun gear rotatably supported relative to the hub axle;
a second sun gear rotatably supported relative to the hub axle;
an intermediate gear unit rotatably supported relative to the hub axle, wherein the intermediate gear unit meshes with the first sun gear and the second sun gear; and
a ring gear meshing with the intermediate gear unit;
a sun gear stop mechanism for selectively nonrotatably coupling at least one of the first sun gear and the second sun gear relative to the hub axle;
wherein the sun gear stop mechanism includes:
a first stop member spaced apart by a first width from a second stop member;
wherein the first stop member and the second stop member are coupled to the hub axle;
a complementary stop unit;
wherein the complementary stop unit is coupled to the first sun gear and the second sun gear;
wherein the complementary stop unit moves between the first stop member and the second stop member for selectively engaging at least one of the first stop member and the second stop member;
wherein at least one of the first stop member, the second stop member and the complementary stop unit includes a surface that pushes the complementary stop unit away from the selectively engaged first stop member and second stop member in response to a rotational force of at least one of the first sun gear and the second sun gear; and
wherein the complementary stop unit comprises a first complementary stop member coupled to the first sun gear and a second complementary stop member coupled to the second gun gear.

24. The internal hub transmission according to claim 23 wherein the complementary stop unit moves in the direction of the axle axis.

25. The internal hub transmission according to claim 24 wherein the first complementary stop member is disposed between the first sun gear and the hub axle, and wherein the second complementary stop member is disposed between the second sun gear and the hub axle.

26. The internal hub transmission according to claim 25 further comprising an actuating member disposed in the hub axle for moving the first sun gear and the second sun gear in the direction of the axle axis.

27. The internal hub transmission according to claim 25 wherein the first complementary stop member is disposed between an inner peripheral surface of the first sun gear and the hub axle, and wherein the second complementary stop member is disposed between an inner peripheral surface of the second sun gear and the hub axle.

28. The internal hub transmission according to claim 27 wherein the first complementary stop member is immovably mounted to the first sun gear, and wherein the second complementary stop member is immovably mounted to the second sun gear.

29. The internal hub transmission according to claim 28 wherein the first complementary stop member is one-piece with the first sun gear, and wherein the second complementary stop member is one-piece with the second sun gear.

30. The internal hub transmission according to claim 29 further comprising an actuating member disposed in the hub axle for moving the first sun gear and the second sun gear in the direction of the axle axis.

31. The internal hub transmission according to claim 25 wherein the first sun gear is separate from the second sun gear.

32. The internal hub transmission according to claim 31 wherein the first sun gear rotates relative to the second sun gear.

33. The internal hub transmission according to claim 32 further comprising a biasing mechanism for biasing the first sun gear toward the second sun gear.

34. The internal hub transmission according to claim 33 wherein the first sun gear contacts the second sun gear.

35. The internal hub transmission according to claim 34 further comprising an actuating member disposed in the hub axle for moving the first sun gear and the second sun gear in the direction of the axle axis.

36. An internal hub transmission for a bicycle comprising:
hub axle for retaining the transmission to a bicycle frame, wherein the hub axle has an axle axis;
a driver rotatably supported relative to the hub axle;
an output member rotatably supported relative to the hub axle;
a planet gear mechanism including:
a sun gear rotatably supported relative to the hub axle and movable in a direction of the axle axis;
a planet gear carrier rotatably supported relative to the hub axle;
a planet gear rotatably supported to the planet gear carrier, wherein the planet gear meshes with the sun gear; and
a ring gear meshing with the planet gear;
wherein the sun gear moves in the direction of the axle axis between a first position, wherein the sun gear is nonrotatably coupled to a first coupled member, and a second position, wherein the sun gear is nonrotatably coupled to a second coupled member;

wherein the first coupled member is one of:
the hub axle;
the driver;
the planet gear carrier; and
the output member;
wherein the second coupled member is a different one of:
the hub axle;
the driver;
the planet gear carrier; and
the output member;
a stop member disposed on one of the sun gear and the first coupled member;
a complementary stop member disposed on the other one of the sun gear and the first coupled member;
wherein at least one of the stop member and the complementary stop member includes a surface that pushes the sun gear away from the first coupled member toward the second coupled member.

* * * * *